(12) United States Patent
Matsumoto et al.

(10) Patent No.: US 8,658,754 B2
(45) Date of Patent: Feb. 25, 2014

(54) MOISTURE-THICKENING HEAT-CONDUCTIVE SILICONE GREASE COMPOSITION

(75) Inventors: Nobuaki Matsumoto, Annaka (JP); Norio Kameda, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 206 days.

(21) Appl. No.: 13/252,524

(22) Filed: Oct. 4, 2011

(65) Prior Publication Data

US 2012/0085964 A1 Apr. 12, 2012

(30) Foreign Application Priority Data

Oct. 6, 2010 (JP) ................................. 2010-226204

(51) Int. Cl.
*C08G 77/04* (2006.01)

(52) U.S. Cl.
USPC ........................................................... 528/34

(58) Field of Classification Search
USPC ........................................................... 528/34
See application file for complete search history.

(56) References Cited

U.S. PATENT DOCUMENTS

| | | | |
|---|---|---|---|
| 6,306,957 B1 | 10/2001 | Nakano et al. | |
| 6,649,258 B2 | 11/2003 | Yamada et al. | |
| 6,818,600 B2 | 11/2004 | Yamada et al. | |
| 7,329,706 B2 | 2/2008 | Fukui et al. | |
| 2004/0242762 A1 | 12/2004 | Horikoshi et al. | |
| 2004/0254275 A1* | 12/2004 | Fukui et al. | 524/261 |
| 2006/0079634 A1 | 4/2006 | Horikoshi et al. | |

FOREIGN PATENT DOCUMENTS

| | | |
|---|---|---|
| CN | 100374490 C | 3/2008 |
| DE | 10 2004 025 867 A1 | 1/2005 |
| EP | 0 896 031 A2 | 2/1999 |
| EP | 1 254 924 A1 | 11/2002 |
| EP | 1 352 947 A1 | 10/2003 |
| JP | 61-157569 | 7/1986 |
| JP | 8-208993 | 8/1996 |
| JP | 2002-327116 | 11/2002 |
| JP | 2003-301189 | 10/2003 |
| JP | 3543663 | 4/2004 |
| JP | 2004-352947 | 12/2004 |
| JP | 4255287 | 2/2009 |

OTHER PUBLICATIONS

Extended European Search Report issued Dec. 23, 2011, in Patent Application No. 11183966.8.

* cited by examiner

*Primary Examiner* — Kuo-Liang Peng
(74) *Attorney, Agent, or Firm* — Oblon, Spivak, McClelland, Maier & Neustadt, L.L.P.

(57) ABSTRACT

A heat-conductive silicone grease composition is obtained by combining (A) a hydroxyl-endcapped organopolysiloxane, (B) a specific organopolysiloxane, (C) a silane compound having at least three hydrolyzable radicals and/or a hydrolyzate thereof, (D) a thickening catalyst, and (E) a heat-conductive filler. The composition is storable at RT, has a low initial viscosity enough to coat, and after coating, thickens with moisture at RT so that it becomes anti-sagging, remains reworkable, and has durable heat resistance.

10 Claims, 1 Drawing Sheet

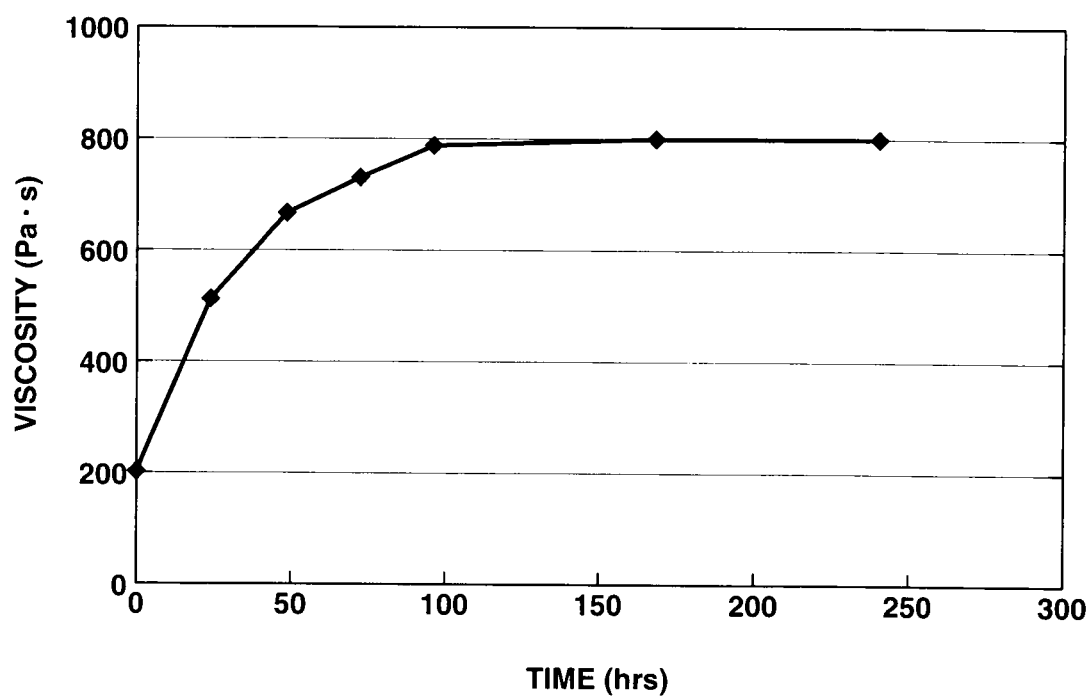

MOISTURE-THICKENING HEAT-CONDUCTIVE SILICONE GREASE COMPOSITION

CROSS-REFERENCE TO RELATED APPLICATION

This non-provisional application claims priority under 35 U.S.C. §119(a) on patent application No. 2010-226204 filed in Japan on Oct. 6, 2010, the entire contents of which are hereby incorporated by reference.

TECHNICAL FIELD

This invention relates to a heat-conductive silicone grease composition which is readily dispensable due to a low initial viscosity and increases its viscosity with moisture at room temperature to become a silicone grease having anti-sagging properties.

BACKGROUND ART

Currently, an ever increasing need for careful management of energy exists in the electric/electronic, transportation and other fields. For more precise control, the system is equipped with more than ever electronic components. In the transportation field, for example, a transition takes place from gasoline vehicles to hybrid vehicles, plug-in hybrid vehicles, and electric vehicles. These hybrid and electric vehicles must be loaded with motors, inverters, batteries, and other electronic components which are unnecessary for gasoline vehicles. Nowadays, heat-conductive silicone grease compositions become indispensable to conduct heat from these heat-generating electronic components to cooling units in an efficient way.

More than ever electronic components must be mounted within a limited space, indicating that electronic components are kept under widely varying conditions including temperature, mount angle, etc. Under the circumstances, heat-generating electronic components and heatsinks are not always held horizontal and accordingly, a heat-conductive material connecting them is often mounted at a certain angle. In such a service environment, a heat-conductive silicone adhesive material, heat-conductive potting material, or RTV heat-conductive silicone rubber composition is used in order to prevent the heat-conductive material from sagging and falling out of the space between the heat-generating component and the heatsink, as disclosed in JP-A H08-208993, JP-A S61-157569, JP-A 2004-352947, JP 3543663, and JP 4255287. However, all these heat-conductive materials form a complete bond to members and undesirably lack re-workability. Since the heat-conductive material becomes very hard after bonding, it cannot withstand repeated stresses induced by thermal strain and separates apart from the heat-generating component, leading to a ramp of thermal resistance. On curing, the heat-conductive material can cause stresses to the electronic component.

The above problem can be solved by a one package addition cure heat-conductive silicone composition as disclosed in JP-A 2002-327116. This composition remains re-workable and anti-sagging even after heat curing. In addition, the cured composition which is a relatively soft rubber may play the role of a stress relief agent. Nevertheless, this heat-conductive material suffers from several problems. For example, it must be stored in a refrigerator or freezer and thawed prior to use. In applying the heat-conductive silicone material, it must be heated and cooled. Then the manufacturing system must be equipped with a heating/cooling oven. The heating and cooling steps take a long time, leading to a reduction of manufacturing efficiency. From the standpoint of energy efficiency, these steps are inefficient because not only the heat-conductive material, but also an overall component must be heated. Additionally, there is a potential risk that if any metal cutting fluid containing an amine compound which is a cure inhibitor is left on the coating surface, the heat-conductive material remains under-cured.

To obviate the cumbersome handling of heat-conductive material including refrigeration/thaw management for storage and heating/cooling steps for application, JP-A 2003-301189 proposes a one package addition cure heat-conductive silicone composition which has been heat crosslinked during preparation. This heat-conductive silicone grease composition has overcome the above-discussed problems, but the tradeoff is that it has too high a viscosity to coat. There are problems that heavy loading of filler is difficult due to the high viscosity of the base polymer and the manufacture process involving crosslinking reaction takes a long time.

One development is a RT moisture-thickening heat-conductive silicone grease composition of dealcoholization type which is storable at RT, which has a low viscosity enough to coat at the initial, and which after coating, increases its viscosity with moisture at RT so that it becomes anti-sagging. Since this silicone grease composition is designed to increase its viscosity (or thicken) with moisture rather than curing with moisture, it is re-workable and applies no substantial stresses to the electronic component. The composition is expected to exploit a new application for heat-conductive silicone grease. However, the composition was found to lack high-temperature durability. There is an urgent need to address the lack of durability.

CITATION LIST

Patent Document 1: JP-A H08-208993
Patent Document 2: JP-A S61-157569
Patent Document 3: JP-A 2004-352947 (US 2004242762, DE 102004025867, CN 100374490)
Patent Document 4: JP 3543663
Patent Document 5: JP 4255287
Patent Document 6: JP-A 2002-327116 (EP 1254924 B1, U.S. Pat. No. 6,649,258)
Patent Document 5: JP-A 2003-301189 (EP 1352947 A1, U.S. Pat. No. 6,818,600)

SUMMARY OF INVENTION

An object of the invention is to provide a heat-conductive silicone grease composition which is storable at RT, which has a low viscosity enough to coat at the initial, and which after coating, increases its viscosity with moisture at RT rather than curing so that it becomes anti-sagging, re-workable, and durably heat resistant.

The inventors have found that a heat-conductive silicone grease composition can be obtained by combining (A) a hydroxyl-endcapped organopolysiloxane having an absolute viscosity of 0.1 to 1,000 Pa-s at 25° C., (B) an organopolysiloxane having the general formula (1) shown below, (C) a silane compound having at least three hydrolyzable radicals and/or a (partial) hydrolyzate or hydrolytic condensate thereof, (D) a thickening catalyst, and (E) a heat-conductive filler having a heat conductivity of at least 10 W/m° C. as essential components. The composition is storable at RT, has a low initial viscosity enough to coat, and after coating, increases its viscosity (or thickens) with moisture at RT so that it becomes anti-sagging, does not lose re-workability because of thickening rather than curing, and has durable heat resistance.

The invention provides a heat-conductive silicone grease composition that will increase its viscosity with moisture at room temperature, comprising (A) 5 to 70 parts by weight of an organopolysiloxane capped with hydroxyl at both ends and having an absolute viscosity of 0.1 to 1,000 Pa-s at 25° C., (B) 30 to 95 parts by weight of an organopolysiloxane having the general formula (1):

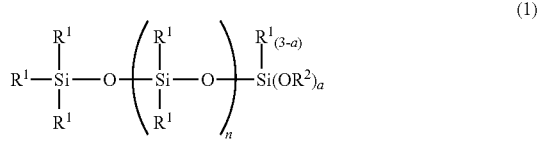

wherein $R^1$ is each independently a substituted or unsubstituted monovalent hydrocarbon radical, $R^2$ is each independently an alkyl, alkoxyalkyl, alkenyl or acyl radical, n is an integer of 2 to 100, and a is an integer of 1 to 3, the sum of components (A) and (B) being 100 parts by weight, (C) 1 to 30 parts by weight of a silane compound having at least three hydrolyzable radicals bonded to silicon in a molecule, and/or a (partial) hydrolyzate or (partial) hydrolytic condensate thereof, (D) 0.01 to 20 parts by weight of a thickening catalyst.

(E) 100 to 2,000 parts by weight of a heat-conductive filler having a heat conductivity of at least 10 W/m° C.

Preferably the composition may further comprise (F) 0.1 to 20 parts by weight relative to 100 parts by weight of components (A) and (B) combined of an organosilane having the general formula (2) and/or a partial hydrolytic condensate thereof.

Herein $R^3$ is each independently an unsubstituted $C_6$-$C_{20}$ alkyl radical, $R^4$ is each independently a substituted or unsubstituted, $C_1$-$C_{20}$ monovalent hydrocarbon radical, $R^5$ is each independently a $C_1$-$C_6$ alkyl radical, b is an integer of 1 to 3, c is an integer of 0 to 2, and b+c is 1 to 3.

Preferably the composition may further comprise (G) 10 to 1,000 parts by weight relative to 100 parts by weight of components (A) and (B) combined of an organopolysiloxane of the average compositional formula (3) having an absolute viscosity of 0.05 to 1,000 Pa-s at 25° C.

Herein $R^6$ is each independently a substituted or unsubstituted, $C_1$-$C_{18}$ monovalent hydrocarbon radical, and d is a positive number of 1.8 to 2.2.

Preferably the composition may further comprise (H) 0.01 to 30 parts by weight relative to 100 parts by weight of components (A) and (B) combined of a silane compound and/or a partial hydrolytic condensate thereof, said silane compound having a radical bonded to a silicon atom via a carbon atom and selected from the group consisting of amino, epoxy, mercapto, acryloyl, and methacryloyl, and a hydrolyzable radical bonded to a silicon atom.

The thickening catalyst (D) is typically selected from the group consisting of alkyltin esters, titanic acid esters, titanium chelates, organic zinc, iron, cobalt, manganese or aluminum compounds, amine compounds or salts thereof, quaternary ammonium salts, alkali metal salts of lower fatty acids, and guanidyl-containing silanes or siloxanes. Most often, the catalyst is a guanidyl-containing silane or siloxane.

ADVANTAGEOUS EFFECTS OF INVENTION

The heat-conductive silicone grease composition is storable at RT, low viscous to coat at the initial, and after coating, increases its viscosity (or thickens) with moisture at RT so that it becomes anti-sagging. The composition remains re-workable because of thickening rather than curing. There is no risk of applying substantial stresses to electronic components. Also the composition is easy to handle because it eliminates a need for refrigeration or freezing during storage and for heating upon application, and a risk of under-cure. Moreover, the composition is easy to manufacture and exhibits its durable heat resistance.

BRIEF DESCRIPTION OF DRAWING

FIG. 1 is a diagram showing a change with time of the viscosity of the composition of Example 1.

DESCRIPTION OF EMBODIMENTS

For convenience of description, room temperature is abbreviated to RT. The abbreviation "pbw" stands for parts by weight. As used herein, the notation (Cn-Cm) means a radical containing from n to m carbon atoms per radical. The term "thicken" or "thickening" has the meaning that a material increases its viscosity.

Briefly stated, the heat-conductive silicone grease composition that will increase its viscosity with moisture at RT comprises (A) a hydroxyl-endcapped organopolysiloxane having an absolute viscosity of 0.1 to 1,000 Pa-s at 25° C., (B) an organopolysiloxane having the general formula (1), (C) a silane compound having at least three hydrolyzable radicals and/or a (partial) hydrolyzate or hydrolytic condensate thereof, (D) a thickening catalyst, and (E) a heat-conductive filler having a heat conductivity of at least 10 W/m° C. as essential components. These components are described in detail.

Component (A) which is a base polymer of the composition is an organopolysiloxane capped with hydroxyl radicals at both ends of its molecular chain. The structure of the organopolysiloxane is not particularly limited as long as it is capped with hydroxyl at both ends. It may be any conventional linear organopolysiloxane which cures into an elastomer. Substituent radicals which may be bonded to silicon atoms include $C_1$-$C_8$ monovalent hydrocarbon radicals, for example, alkyl radicals such as methyl, ethyl, propyl, butyl, pentyl, hexyl and heptyl, cycloalkyl radicals such as cyclohexyl, alkenyl radicals such as vinyl and allyl, and aryl radicals such as phenyl and tolyl, and halogenated forms of the foregoing hydrocarbon radicals in which some or all hydrogen atoms are substituted by halogen atoms (e.g., chloro, fluoro or bromo), such as chloromethyl, 3-chloropropyl and trifluoromethyl.

The organopolysiloxane as component (A) should have an absolute viscosity at 25° C. of 0.1 to 1,000 Pa-s, preferably 0.3 to 100 Pa-s, and more preferably 0.5 to 50 Pa-s. A viscosity of less than 0.1 Pa-s may lead to slow thickening. An organopolysiloxane having a viscosity in excess of 1,000 Pa-s provides a silicone grease composition with too high a viscosity to coat. It is noted that throughout the disclosure the absolute viscosity is measured by a rotational viscometer.

Preferably component (A) is an organopolysiloxane having the general formula (4).

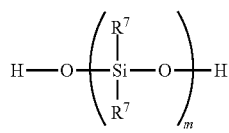
(4)

Herein $R^7$ is each independently a substituted or unsubstituted, $C_1$-$C_6$ monovalent hydrocarbon radical. Suitable monovalent hydrocarbon radicals include alkyl radicals such as methyl, ethyl, propyl, butyl, pentyl, hexyl and heptyl, cycloalkyl radicals such as cyclohexyl, alkenyl radicals such as vinyl and allyl, aryl radicals such as phenyl and tolyl, and halogen or cyano-substituted forms of the foregoing hydrocarbon radicals in which some or all hydrogen atoms are substituted by halogen atoms (e.g., chloro, fluoro or bromo) or cyano radicals, such as chloromethyl, 3-chloropropyl, trifluoromethyl and cyanoethyl. The subscript m is such a number that the organopolysiloxane of formula (4) may have an absolute viscosity of 0.1 to 1,000 Pa-s, preferably 0.3 to 100 Pa-s at 25° C.

The organopolysiloxane as component (A) may be used alone or in admixture of two or more. Component (A) is used in an amount of 5 to 70 parts by weight (pbw), preferably 10 to 60 pbw, provided that components (A) and (B) total to 100 parts by weight (pbw). A composition containing less than 5 pbw of component (A) does not thicken whereas a composition containing more than 70 pbw of component (A) cures rather than thickening.

Component (B) is an organopolysiloxane having the general formula (1):

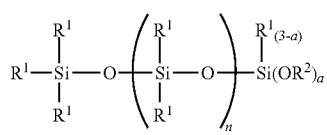
(1)

wherein $R^1$ is each independently a substituted or unsubstituted monovalent hydrocarbon radical, $R^2$ is each independently an alkyl, alkoxyalkyl, alkenyl or acyl radical, n is an integer of 2 to 100, and a is an integer of 1 to 3. This organopolysiloxane should preferably have an absolute viscosity of 0.005 to 100 Pa-s at 25° C. Component (B) plays the important role of maintaining the composition in grease form even after thickening without letting the composition cure to completion.

In formula (1), $R^1$ is each independently a substituted or unsubstituted monovalent hydrocarbon radical, preferably of 1 to 10 carbon atoms, more preferably 1 to 6 carbon atoms, and even more preferably 1 to 3 carbon atoms. Examples include straight, branched and cyclic alkyl, alkenyl, aryl, aralkyl, haloalkyl and cyanoalkyl radicals. Suitable straight alkyl radicals include methyl, ethyl, propyl, hexyl and octyl. Suitable branched alkyl radicals include isopropyl, isobutyl, tert-butyl and 2-ethylhexyl. Suitable cyclic alkyl radicals include cyclopentyl and cyclohexyl. Suitable alkenyl radicals include vinyl and allyl. Suitable aryl radicals include phenyl and tolyl. Suitable aralkyl radicals include 2-phenylethyl and 2-methyl-2-phenylethyl. Suitable haloalkyl radicals include 3,3,3-trifluoropropyl, 2-(nonafluorobutyl)ethyl, and 2-(heptadecafluorooctyl)ethyl. A typical cyanoalkyl radical is cyanoethyl. Preferably $R^1$ is methyl, phenyl or vinyl.

$R^2$ is each independently an alkyl, alkoxyalkyl, alkenyl or acyl radical. Suitable alkyl radicals include straight, branched and cyclic alkyl radicals as exemplified above for $R^1$. Suitable alkoxyalkyl radicals include methoxyethyl and methoxypropyl. Suitable acyl radicals include acetyl and octanoyl. Preferably $R^2$ is alkyl, and more preferably methyl or ethyl.

The subscript n is an integer of 2 to 100, preferably 5 to 80, and a is an integer of 1 to 3, preferably equal to 3.

The organopolysiloxane as component (B) should preferably have an absolute viscosity at 25° C. of 0.005 to 100 Pa-s, more preferably 0.005 to 50 Pa-s. If the viscosity is less than 0.005 Pa-s, the resulting silicone grease composition is susceptible to oil bleeding and sagging. If the viscosity exceeds 100 Pa-s, the resulting silicone grease composition becomes less flowable and ineffective in coating operation.

Illustrative non-limiting examples of the organopolysiloxane as component (B) are given below where Me stands for methyl.

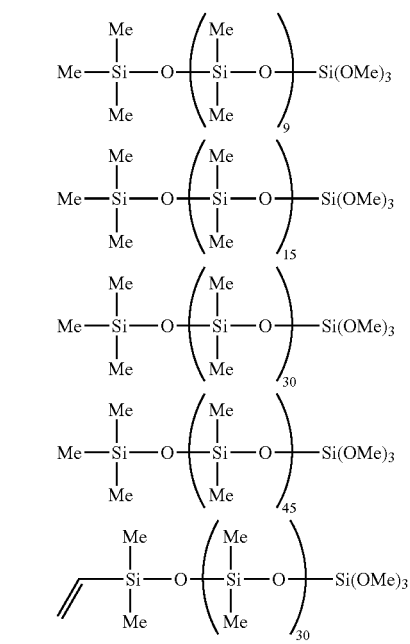

The organopolysiloxane as component (B) may be used alone or in admixture of two or more. Component (B) is used in an amount of 30 to 95 pbw, preferably 40 to 90 pbw, provided that the sum of components (A) and (B) is 100 pbw. A composition containing less than 30 pbw of component (B) becomes hard rather than flexible after thickening whereas a composition containing more than 95 pbw of component (B) does not thicken.

Component (C) is a silane compound having at least three hydrolyzable radicals bonded to silicon atoms in a molecule, and/or a (partial) hydrolyzate or (partial) hydrolytic condensate thereof. Component (C) serves as a thickener. The preferred silane compound has the general formula (5).

$$R^8_e SiX_{4-e}$$ (5)

In formula (5), $R^8$ is a substituted or unsubstituted monovalent hydrocarbon radical, examples of which are as illustrated for $R^1$ in formula (1) and $R^7$ in formula (4). Inter alia, $C_1$-$C_3$ alkyl, vinyl and phenyl are preferred. X is a hydrolyzable radical, examples of which include alkoxy, alkenyloxy, ketoxime, acetoxy, amino, amide, and aminoxy radicals, with alkenyloxy being preferred. The subscript e is equal to 0 or 1.

Illustrative examples of the silane compound and the (partial) hydrolyzate or (partial) hydrolytic condensate thereof include alkoxysilanes such as tetramethoxysilane, tetraethoxysilane, methyltrimethoxysilane, ethyltrimethoxysilane, vinyltrimethoxysilane, 3,3,3-trifluoropropyltrimethoxysilane, β-cyanoethyltrimethoxysilane, tetraisopropoxysilane, tetrabutoxysilane, phenyltrimethoxysilane, octadecyltrimethoxysilane, tetra(β-chloroethoxy)silane, tetra(2,2,2-trifluoroethoxy)silane, propyltris(δ-chlorobutoxy)silane, and methyltris(methoxyethoxy)silane; alkoxysiloxanes such as ethyl polysilicate and dimethyltetramethoxydisiloxane; ketoximesilanes such as methyltris(methylethylketoxime)silane, vinyltris(methylethylketoxime)silane, phenyltris(methylethylketoxime)silane, methyltris(diethylketoxime)silane, and tetra(methylethylketoxime)silane; aminosilanes such as methyltris(cyclohexylamino)silane and vinyltris(n-butylamino)silane; amidosilanes such as methyltris(N-methylacetamido)silane, methyltris(N-butylacetamido)silane, and methyltris(N-cyclohexylacetamido)silane; aminoxysilanes such as methyltris(N,N-diethylaminoxy)silane; alkenyloxysilanes such as methyltri(isopropenoxy)silane, vinyltri(isopropenoxy)silane, and phenyltri(isopropenoxy)silane; and acetoxysilanes such as methyltriacetoxysilane and vinyltriacetoxysilane. These compounds may be used alone or in admixture of two or more.

Component (C) is used in an amount of 1 to 30 pbw, preferably 2 to 10 pbw, relative to 100 pbw of components (A) and (B) combined. A composition containing less than 1 pbw of component (C) does not thicken whereas a composition containing more than 30 pbw of component (C) is also unlikely to thicken.

Since the silicone grease composition is of condensation thickening type, a thickening or condensation catalyst is used therein as component (D). Suitable catalysts include alkyltin ester compounds such as dibutyltin diacetate, dibutyltin dilaurate and dibutyltin dioctoate; titanic acid esters such as tetraisopropoxytitanium, tetra-n-butoxytitanium, tetrakis(2-ethylhexoxy)titanium, dipropoxybis(acetylacetonato)titanium and titanium isopropoxyoctylene glycol; titanium chelate compounds such as diisopropoxybis(ethyl acetoacetate) titanium, diisopropoxybis(methyl acetoacetate) titanium, diisopropoxybis(acetylacetonate)titanium, dibutoxybis (ethyl acetoacetonate)titanium, and dimethoxybis(ethyl acetoacetonate)titanium; organometallic compounds of zinc, iron, cobalt, manganese or aluminum such as zinc naphthenate, zinc stearate, zinc 2-ethyloctoate, iron 2-ethylhexoate, cobalt 2-ethylhexoate, manganese 2-ethylhexoate, cobalt naphthenate and alkoxyaluminum compounds; amine compounds and salts thereof such as hexylamine and dodecylamine phosphate: quaternary ammonium salts such as benzyltriethylammonium acetate; alkali metal salts of lower fatty acids such as potassium acetate, sodium acetate and lithium oxalate; dialkylhydroxylamines such as dimethylhydroxylamine and diethylhydroxylamine; guanidyl-containing silanes and siloxanes such as tetramethylguanidylpropyltrimethoxysilane, tetramethylguanidylpropylmethyldimethoxysilane and tetramethylguanidylpropyltris(trimethylsiloxy)silane. The catalysts may be used alone or in admixture of two or more. Among others, preferred are guanidyl-containing silanes and siloxanes such as tetramethylguanidylpropyltrimethoxysilane, tetramethylguanidylpropylmethyldimethoxysilane and tetramethylguanidylpropyltris(trimethylsiloxy)silane.

Component (D) is added in an amount of 0.01 to 20 pbw, preferably 0.1 to 5 pbw, relative to 100 pbw of components (A) and (B) combined. A composition containing a less amount of component (D) does not thicken whereas an excess of component (D) achieves no further effects and is uneconomical.

Component (E) is a heat conductive filler having a thermal conductivity of at least 10 W/m° C., preferably at least 15 W/m° C. If a filler with a thermal conductivity of less than 10 W/m° C. is used, the silicone grease composition also has a lower than desired thermal conductivity. Examples of the heat conductive filler include aluminum, copper, silver, nickel, gold, alumina, zinc oxide, magnesium oxide, aluminum nitride, boron nitride, silicon nitride, diamond, and carbon, all in powder form. Any desired filler can be used as long as it has a thermal conductivity of at least 10 W/m° C. A powder of one type or a mixture of two or more types may be used.

The heat conductive filler is typically particulate and may be of any desired shape including irregular and spherical shapes. Preferably the heat conductive filler has an average particle size in the range of 0.1 to 200 μm, more preferably 0.1 to 100 μm. With an average particle size of less than 0.1 μm, the composition may lose grease nature and become less spreadable. If the average particle size is more than 200 μm, the grease composition may lose uniformity. As used herein, the "average particle size" is a weight average value or median diameter on particle size measurement by the laser light diffraction method.

Component (E) is loaded in an amount of 100 to 2,000 pbw, preferably 500 to 1,500 pbw, relative to 100 pbw of components (A) and (B) combined. Less than 100 pbw of component (E) fails to provide the desired heat conductivity whereas a composition with more than 2,000 pbw of component (E) loses grease nature and becomes less spreadable.

To the silicone grease composition, (F) an organosilane having the general formula (2) and/or a partial hydrolytic condensate thereof may be compounded, if desired, for further reducing the viscosity of the composition.

$$R^3{}_b R^4{}_c Si(OR^5)_{4-b-c} \quad (2)$$

Herein $R^3$ is each independently an unsubstituted $C_6$-$C_{20}$ alkyl radical, $R^4$ is each independently a substituted or unsubstituted, $C_1$-$C_{20}$ monovalent hydrocarbon radical, $R^5$ is each independently a $C_1$-$C_6$ alkyl radical, b is an integer of 1 to 3, c is an integer of 0 to 2, and b+c is 1 to 3.

In formula (2), $R^3$ is an unsubstituted $C_6$-$C_{20}$ alkyl radical, for example, hexyl, octyl, decyl, dodecyl, tetradecyl, hexadecyl, and octadecyl. Of these, $C_6$-$C_{14}$ alkyl radicals are preferred.

$R^4$ is a substituted or unsubstituted, monovalent hydrocarbon radical of 1 to 20 carbon atoms, preferably 1 to 10 carbon atoms. Suitable monovalent hydrocarbon radicals include alkyl radicals such as methyl, ethyl, propyl, hexyl, octyl, decyl, dodecyl, tetradecyl, hexadecyl, and octadecyl, cycloalkyl radicals such as cyclopentyl and cyclohexyl, alkenyl radicals such as vinyl and allyl, aryl radicals such as phenyl and tolyl, aralkyl radicals such as 2-phenylethyl and 2-methyl-2-phenylethyl, and halogenated forms of the foregoing hydrocarbon radicals in which some or all hydrogen atoms are substituted by halogen atoms (e.g., chloro, fluoro or bromo), such as 3,3,3-trifluoropropyl, 2-(perfluorobutyl) ethyl, 2-(perfluorooctyl)ethyl and p-chlorophenyl. Inter alia, methyl is preferred.

$R^5$ is a $C_1$-$C_6$ alkyl radical, such as methyl, ethyl, propyl, butyl, pentyl or hexyl. Inter alia, methyl and ethyl are preferred. The subscript b is an integer of 1 to 3, c is an integer of 0 to 2, and b+c is 1, 2 or 3, preferably equal to 1.

Preferred examples of the organosilane (F) include $C_{10}H_{21}Si(OCH_3)_3$, $C_{10}H_{21}Si(OCH_2CH_3)_3$, $C_{14}H_{29}Si$ (OCH$_3$)$_3$, and C$_{14}$H$_{29}$Si(OCH$_2$CH$_3$)$_3$. The organosilanes may be used alone or in admixture of two or more.

The organosilane or partial hydrolytic condensate thereof as component (F) is preferably used in an amount of 0.1 to 20 pbw, more preferably 0.2 to 15 pbw, relative to 100 pbw of components (A) and (B) combined. With less than 0.1 pbw of component (F), the water resistance of the heat-conductive filler may be poor. More than 20 pbw of component (F) may achieve no further effects and be uneconomical.

To the silicone grease composition, (G) an organopolysiloxane end-capped with a triorganosiloxy radical, typically trialkylsiloxy, and having an absolute viscosity of 0.05 to 1,000 Pa-s at 25° C. may be compounded, if desired, for adjusting the initial viscosity of the composition. This organopolysiloxane has the average compositional formula (3):

$$R^6{}_d SiO_{(4-d)/2} \quad (3)$$

wherein R$^6$ is each independently a substituted or unsubstituted, C$_1$-C$_{18}$ monovalent hydrocarbon radical, and d is a positive number of 1.8 to 2.2.

In formula (3), R$^6$ is a substituted or unsubstituted, C$_1$-C$_{18}$ monovalent hydrocarbon radical, examples of which include alkyl radicals such as methyl, ethyl, propyl, pentyl, hexyl, heptyl, octyl, nonyl, decyl, dodecyl, tetradecyl, hexadecyl and octadecyl, cycloalkyl radicals such as cyclopentyl and cyclohexyl, alkenyl radicals such as vinyl and allyl, aryl radicals such as phenyl and tolyl, aralkyl radicals such as 2-phenylethyl and 2-methyl-2-phenylethyl, and halogenated forms of the foregoing hydrocarbon radicals in which some or all hydrogen atoms are substituted by halogen atoms (e.g., chloro, fluoro or bromo), such as 3,3,3-trifluoropropyl, 2-(perfluorobutyl)ethyl, 2-(perfluorooctyl)ethyl and p-chlorophenyl. Inter alia, methyl, phenyl and C$_6$-C$_{14}$ alkyl radicals are preferred. The subscript d is a positive number of 1.8 to 2.2, preferably 1.9 to 2.2, when the desired viscosity of the silicone grease composition is considered.

The organopolysiloxane as component (G) should preferably have an absolute viscosity at 25° C. of 0.05 to 1,000 Pa-s, more preferably 0.5 to 100 Pa-s. If the organopolysiloxane has a viscosity of less than 0.05 Pa-s, the resulting silicone grease composition may be susceptible to oil bleeding. If the viscosity exceeds 1,000 Pa-s, the resulting silicone grease composition may become ineffective in coating operation.

Illustrative non-limiting examples of the organopolysiloxane as component (G) are given below wherein Me stands for methyl.

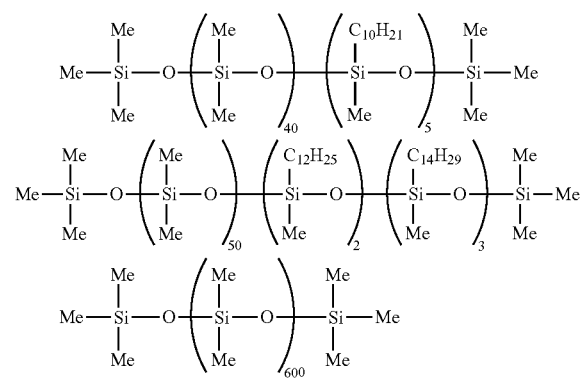

The organopolysilane as component (G) is preferably used in an amount of 10 to 1,000 pbw, more preferably 20 to 500 pbw, relative to 100 pbw of components (A) and (B) combined. Less than 10 pbw of component (G) may achieve less a diluting effect whereas a silicone grease composition containing more than 1,000 pbw of component (G) may not readily increase its viscosity with moisture.

The silicone grease composition may further comprise (H) a silane compound having a functional radical and a hydrolyzable radical and/or a partial hydrolytic condensate thereof. Specifically the silane compound has a functional radical bonded to a silicon atom via a carbon atom and selected from the group consisting of amino, epoxy, mercapto, acryloyl, and methacryloyl, and a hydrolyzable radical bonded to a silicon atom. Component (H) has the function of enhancing the adhesion between the composition and a substrate surface which is coated therewith.

Preferably the silane compound or partial hydrolytic condensate thereof as component (H) has one to three hydrolyzable radicals, more preferably two or three hydrolyzable radicals. When the silane compound or partial hydrolytic condensate thereof has two or more functional radicals, they may be bonded to a silicon atom either via different carbon atoms or via a common carbon atom. Examples of the hydrolyzable radical are as illustrated for X in formula (5) as component (C), with alkoxy being preferred.

Examples of the silane compound as component (H) include amino-containing silanes such as 3-aminopropyldimethoxymethylsilane, 3-aminopropyltrimethoxysilane, 3-aminopropyltriethoxysilane, 3-(2-aminoethylamino)propyldimethoxymethylsilane, 3-(2-aminoethylamino)propyltrimethoxysilane, 2-aminoethylaminomethyldimethoxymethylsilane, and 2-aminoethylaminomethyltrimethoxysilane; mercapto-containing silanes such as γ-mercaptopropyltrimethoxysilane, γ-mercaptopropyltriethoxysilane, γ-mercaptopropylmethyldimethoxysilane, and γ-mercaptopropylmethyldiethoxysilane; epoxy-containing silanes such as 3-glycidoxypropyltrimethoxysilane, 3-glycidoxypropyldimethoxymethylsilane, 3-glycidoxyethyltrimethoxysilane, and 3-glycidoxyethyldimethoxymethylsilane; and (meth)acryloyl-containing silanes such as methacryloxypropyltrimethoxysilane, methacryloxypropyltriethoxysilane, methacryloxypropylmethyldimethoxysilane, acryloxypropyltrimethoxysilane, and acryloxypropyltriethoxysilane. The silane compound as component (H) is not limited to one, and a mixture of two or more silane compounds may be used.

The silane compound as component (H) is preferably used in an amount of 0.01 to 30 pbw, more preferably 0.1 to 20 pbw, relative to 100 pbw of components (A) and (B) combined. Less than 0.01 pbw of component (H) may be less effective for enhancing adhesion whereas more than 30 pbw of component (H) may achieve no further adhesion enhancing effects and be uneconomical.

The heat-conductive silicone grease composition of the invention is prepared by mixing the essential and optional components on any well-known means until uniform. The composition thus obtained should preferably have an absolute viscosity at 25° C. of 10 to 300 Pa-s, more preferably 50 to 250 Pa-s.

The silicone grease composition of the invention is distinguished from ordinary silicone compositions (including adhesive, potting and RTV heat-conductive silicone rubber materials) in that it increases its viscosity without curing. As long as moisture is available, the composition increases its viscosity even at RT, eliminating a step of heating. The composition may be stored without a need for refrigeration or freezing.

The silicone grease composition increases its viscosity with moisture, for example, under ambient conditions at a temperature of 23±2° C. and a relative humidity (RH) of 50±5% for 7 days, reaching an absolute viscosity at 25° C. of preferably 500 to 2,000 Pa-s, more preferably 700 to 1,500 Pa-s.

The heat-conductive silicone grease composition that merely thickens with moisture rather than curing has several advantages. When applied as heat-dissipating grease to an electronic part, the composition remains fully re-workable and is unlikely to substantially stress the electronic part. Because of durable heat resistance, the composition is useful in a wide variety of heat-dissipating and heat-resisting applications such as electric/electronic and transportation fields.

EXAMPLE

Examples of the invention are given below by way of illustration and not by way of limitation. Examples demonstrate advantages of the invention. In Examples, Me stands for methyl.

The following components were prepared.
Component A
A-1: dimethylpolysiloxane capped with hydroxyl at both ends and having an absolute viscosity of 1 Pa-s at 25° C.
A-2: dimethylpolysiloxane capped with hydroxyl at both ends and having an absolute viscosity of 20 Pa-s at 25° C.
A-3 (comparison): dimethylpolysiloxane capped with hydroxyl at both ends and having an absolute viscosity of 0.08 Pa-s at 25° C.
A-4 (comparison): dimethylpolysiloxane capped with hydroxyl at both ends and having an absolute viscosity of 1,100 Pa-s at 25° C.
A-5 (comparison): dimethylpolysiloxane capped with trimethoxysilyl at both ends and having an absolute viscosity of 1 Pa-s at 25° C.
Component B
B-1: organopolysiloxane of the following formula.

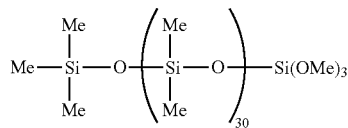

B-2: organopolysiloxane of the following formula.

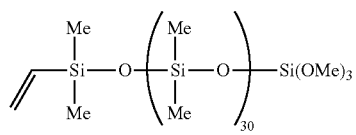

Component C
C-1: phenyltri(isopropenoxy)silane
C-2: vinyltri(isopropenoxy)silane
Component D
D-1: tetramethylguanidylpropyltrimethoxysilane
D-2: diisopropoxybis(ethyl acetoacetate)titanium
Component E
Powders E-1 to E-3 were prepared by milling the following heat-conductive fillers (1), (2) and (3) in a mixing ratio shown in Table 1 for 15 minutes at RT on a 5-L gate mixer (5-L Planetary Mixer by Inoue Mfg. Co., Ltd.). It is noted that E-3 consists of zinc oxide powder.

| Powder | Average particle size | Heat conductivity |
|---|---|---|
| (1) aluminum | 10 μm | 27 W/m° C. |
| (2) aluminum | 15 μm | 236 W/m° C. |
| (3) zinc oxide | 1.0 μm | 25 W/m° C. |

TABLE 1

| Component E | 10 μm aluminum powder, g | 15.0 μm aluminum powder, g | 1.0 μm zinc oxide powder, g |
|---|---|---|---|
| E-1 | 2,000 | 0 | 500 |
| E-2 | 0 | 2,000 | 500 |
| E-3 | 0 | 0 | 500 |

Component F
F-1: organosilane of $C_{10}H_{21}Si(OCH_3)_3$
Component G
G-1: organopolysiloxane of the following formula having an absolute viscosity of 5 Pa-s at 25° C.

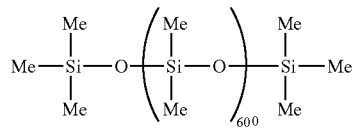

Component H
H-1: 3-aminopropyltriethoxysilane

Examples 1 to 5 and Comparative Examples 1 to 6

Compositions of Examples and Comparative Examples were prepared by mixing components (A) to (H) in the amounts shown in Tables 2 and 3. Specifically, a 5-L gate mixer (5-L Planetary Mixer by Inoue Mfg. Co., Ltd.) was charged with the predetermined amounts of components (A), (B) and (E), followed by agitation at 150° C. for 3 hours while deaerating. The mixture was then cooled to RT, to which components (C) and (D) were added. The mixture was agitated at RT until uniform while deaerating. If necessary, component (F), (G) or (H) was added, and the mixture was agitated at RT until uniform while deaerating. The resulting grease composition was measured for viscosity and heat conductivity by the test methods shown below. The results are also shown in Tables 2 and 3.
Initial Viscosity
The initial viscosity of a grease composition was measured at 25° C. by a spiral viscometer PC-1T (Malcom Co., Ltd.).
Viscosity after Thickening
A grease composition was shaped in a sheet form of 3.0 mm thick and allowed to stand at 23±2° C. and 50±5% RH for 7 days before a viscosity was measured at 25° C. by a viscometer Malcom PC-1T. FIG. 1 is a diagram showing how the composition of Example 1 thickened under these conditions.
Viscosity after Heat Resistant Test
A grease composition was shaped in a sheet form of 3.0 mm thick, allowed to stand at 23±2° C. and 50±5% RH for 7 days, and exposed to 150° C. for 500 hours. After the temperature was returned to 25° C., a viscosity was measured by a viscometer Malcom PC-1T.

Heat Conductivity

The heat conductivity of a grease composition prior to thickening was measured at 23° C. by a hot disc method thermal properties analyzer TPA-501 (Kyoto Electronics Mfg. Co., Ltd.).

TABLE 2

| Formulation | | Example | | | | |
|---|---|---|---|---|---|---|
| (pbw) | | 1 | 2 | 3 | 4 | 5 |
| Component A | A-1 | 50 | 20 | 50 | 60 | 0 |
| | A-2 | 0 | 0 | 0 | 0 | 20 |
| | A-3 | 0 | 0 | 0 | 0 | 0 |
| | A-4 | 0 | 0 | 0 | 0 | 0 |
| | A-5 | 0 | 0 | 0 | 0 | 0 |
| Component B | B-1 | 50 | 80 | 50 | 0 | 80 |
| | B-2 | 0 | 0 | 0 | 40 | 0 |
| Component C | C-1 | 5 | 6 | 5 | 0 | 5 |
| | C-2 | 0 | 0 | 0 | 7 | 0 |
| Component D | D-1 | 0.25 | 0.25 | 0.25 | 0.30 | 0.25 |
| | D-2 | 0 | 0 | 0 | 0 | 0 |
| Component E | E-1 | 1,200 | 1,600 | 0 | 0 | 1,200 |
| | E-2 | 0 | 0 | 1,000 | 0 | 0 |
| | E-3 | 0 | 0 | 0 | 600 | 0 |
| Component F | F-1 | 0 | 0 | 2.0 | 0 | 0 |
| Component G | G-1 | 0 | 0 | 0 | 50 | 0 |
| Component H | H-1 | 0 | 0 | 2.0 | 0 | 0 |
| | | Test results | | | | |
| Initial viscosity (Pa·s) | | 200 | 220 | 202 | 180 | 232 |
| Initial heat conductivity (W/m° C.) | | 3.1 | 4.0 | 4.5 | 1.0 | 3.0 |
| Viscosity after thickening (Pa·s) | | 802 | 504 | 750 | 686 | 498 |
| Viscosity after 150° C./500 hr exposure (Pa·s) | | 820 | 553 | 786 | 700 | 521 |

TABLE 3

| Formulation | | Comparative Example | | | | | |
|---|---|---|---|---|---|---|---|
| (pbw) | | 1 | 2 | 3 | 4 | 5 | 6 |
| Component A | A-1 | 0 | 0 | 95 | 10 | 50 | 0 |
| | A-2 | 0 | 0 | 0 | 0 | 0 | 0 |
| | A-3 | 50 | 0 | 0 | 0 | 0 | 0 |
| | A-4 | 0 | 20 | 0 | 0 | 0 | 0 |
| | A-5 | 0 | 0 | 0 | 0 | 0 | 10 |
| Component B | B-1 | 50 | 80 | 5 | 90 | 50 | 90 |
| | B-2 | 0 | 0 | 0 | 0 | 0 | 0 |
| Component C | C-1 | 5 | 0 | 5 | 6 | 5 | 0 |
| | C-2 | 0 | 0 | 0 | 0 | 0 | 0 |
| Component D | D-1 | 0.25 | 0 | 0.25 | 0.30 | 0.30 | 0 |
| | D-2 | 0 | 0 | 0 | 0 | 0 | 8.0 |
| Component E | E-1 | 1,200 | 1,200 | 1,200 | 0 | 80 | 0 |
| | E-2 | 0 | 0 | 0 | 2,200 | 0 | 1,100 |
| | E-3 | 0 | 0 | 0 | 0 | 0 | 0 |
| Component F | F-1 | 0 | 0 | 3 | 5 | 5 | 2.0 |
| Component G | G-1 | 0 | 0 | 0 | 0 | 0 | 0 |
| Component H | H-1 | 0 | 0 | 0 | 0 | 0 | 0 |
| | | Test results | | | | | |
| Initial viscosity (Pa·s) | | 60 | not greasy | 350 | not greasy | 5 | 65 |
| Initial heat conductivity (W/m° C.) | | 3.2 | unmeasurable | 3.0 | unmeasurable | 0.2 | 4.6 |
| Viscosity after thickening (Pa·s) | | 70 (not thickened) | unmeasurable | unmeasurable (cured into rubber) | unmeasurable | 300 | 950 |
| Viscosity after 150° C./500 hr exposure (Pa·s) | | 64 | unmeasurable | unmeasurable | unmeasurable | 362 | not greasy |

Japanese Patent Application No. 2010-226204 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A heat-conductive silicone grease composition that will increase its viscosity with moisture at room temperature, comprising:
   (A) 5 to 70 parts by weight of an organopolysiloxane capped with hydroxyl at both ends and having an absolute viscosity of 0.1 to 1,000 Pa-s at 25° C;
   (B) 30 to 95 parts by weight of an organopolysiloxane having the general formula (1):

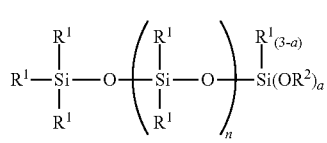

wherein each $R^1$ is independently a substituted or unsubstituted monovalent hydrocarbon radical, each $R^2$ is independently an alkyl, alkoxyalkyl, alkenyl, or acyl radical, n is an integer of 2 to 80, and a is an integer of 1 to 3, the sum of components (A) and (B) being 100 parts by weight;
   (C) 1 to 30 parts by weight of a silane compound having at least three hydrolyzable radicals bonded to silicon in a molecule, and/or a (partial) hydrolyzate or (partial) hydrolytic condensate thereof;
   (D) 0.01 to 20 parts by weight of a thickening catalyst; and
   (E) 100 to 2,000 parts by weight of a heat-conductive filler having a heat conductivity of at least 10 W/m° C.

2. The composition of claim 1, further comprising:
   (F) 0.1 to 20 parts by weight relative to 100 parts by weight of components (A) and (B) combined of an organosilane having the general formula (2):

wherein each $R^3$ is independently an unsubstituted $C_6$-$C_{20}$ alkyl radical, each $R^4$ is independently a substituted or unsubstituted, $C_1$-$C_{20}$ monovalent hydrocarbon radical, each $R^5$ is independently a $C_1$-$C_6$ alkyl radical, b is an integer of 1 to 3, c is an integer of 0 to 2, and b+c is 1 to 3, and/or a partial hydrolytic condensate thereof.

3. The composition of claim 1, further comprising:
   (G) 10 to 1,000 parts by weight relative to 100 parts by weight of components (A) and (B) combined of a second organopolysiloxane having the average compositional formula (3):

wherein each $R^6$ is independently a substituted or unsubstituted, $C_1$-$C_{18}$ monovalent hydrocarbon radical, and d is a positive number of 1.8 to 2.2, and said second organopolysiloxane has an absolute viscosity of 0.05 to 1,000 Pa-s at 25° C.

4. The composition of claim 1, further comprising:
   (H) 0.01 to 30 parts by weight relative to 100 parts by weight of components (A) and (B) combined of a second silane compound and/or a partial hydrolytic condensate thereof, said second silane compound having a radical bonded to a silicon atom via a carbon atom and selected from the group consisting of amino, epoxy, mercapto, acryloyl, and methacryloyl, and a hydrolyzable radical bonded to a silicon atom.

5. The composition of claim h wherein said thickening catalyst (D) is at least one member selected from the group consisting of an alkyltin ester, a titanic acid ester, a titanium chelate, an organic zinc compound, an organic iron compound, an organic cobalt compound, an organic manganese compound, an organic aluminum compound, an amine compound, a quaternary ammonium salt, an alkali metal salt of a lower fatty acid, a guanidyl-containing silane, and a guanidyl-containing siloxane.

6. The composition of claim 5, wherein said thickening catalyst (D) is a guanidyl-containing silane or a guanidyl-containing siloxane.

7. The composition of claim 1, wherein n is an integer of 5 to 80.

8. The composition of claim 1, wherein said organopolysiloxane (A) has an absolute viscosity at 25° C. of 0.3 to 100 Pa-s.

9. The composition of claim 1, wherein said organopolysiloxane (A) has an absolute viscosity at 25° C. of 0 0.5 to 50 Pa-s.

10. The composition of claim 1, wherein said heat-conductive filler is selected from the group consisting of aluminum, copper, silver, nickel, gold, alumina, zinc oxide, magnesium oxide, aluminum nitride, boron nitride, silicon nitride, diamond, and carbon.

* * * * *